United States Patent Office 3,057,791
Patented Oct. 9, 1962

3,057,791
RADIATION CURING OF POLYMERS
Herbert R. Anderson, Jr., Bartlesville, Okla., assignor to Phillips Petroleum Company, a corporation of Delaware
No Drawing. Filed July 5, 1959, Ser. No. 824,909
4 Claims. (Cl. 204—154)

This invention relates to a method of curing olefinic polymers by radiation. In another aspect it relates to a crosslinked polymer which has been cured by radiation with thermal neutrons.

A potentially valuable method for vulcanizing rubber and crosslinking similar olefinic polymers is by irradiation in a thermal neutron field. The disadvantage of this process is that rubber and similar polymers are transparent to thermal neutrons as is the conventional filler, carbon black. Of considerable importance in the irradiation curing of any polymer which is subsequently to be used by the public is residual radioactivity which may be imparted by exposing the material to bombardment by thermal neutrons.

I have found that olefinic polymers such as natural and synthetic rubber can be safely and adequately cured or vulcanized by incorporating into the polymer before irradiation lithium, either in its free state or as a compound, and thereafter subjecting the resulting composition to irradiation with thermal neutrons. Lithium has been found to promote the vulcanization or crosslinking of polymers in a thermal neutron field in a highly desirable manner as this metal has relatively short-lived residual radioactivity. In addition to the lithium, reinforcing agents such as carbon black, silica or titanium dioxide can be used in the composition but no curatives are required.

It is an object of my invention to provide a method of curing olefinic polymers by radiation in a thermal neutron field. Another object is to provide a method of vulcanizing rubbery polymers without the use of curatives such as sulfur. A further object is to provide a cured olefinic polymer which has been crosslinked by radiation with thermal neutrons. Other objects, advantages and features of my invention will be apparent to those skilled in the art from the following discussion.

The polymers which can be crosslinked by my invention are generally the polymers of olefinic compounds such as polyethylene, polystyrene, polyvinyl acetate, polyvinyl alcohol, polypropylene, and the like. My invention is particularly useful when vulcanizing the rubbery polymers such as natural or synthetic rubber. Examples of such synthetic rubbery polymers are polymers of conjugated dienes having from 4 to 8 carbon atoms per molecule, such as polybutadiene, polyisoprene, polychloroprene, and the like, and copolymers of such conjugated dienes in a major amount with a minor amount of a copolymerizable monomer containing a $CH_2=C<$ group. Examples of such copolymers are butadiene-styrene copolymers, butadiene-acrylonitrile copolymers, butadiene-isoprene copolymers, and the like. Further examples of copolymerizable monomers which can be used with conjugated dienes are alpha-methylstyrene, halogen-substituted styrenes, alkyl-substituted styrenes, alkoxy-substituted styrenes, 2-vinylpyridine, 5-methyl-2-vinylpyridine, 5-ethyl-2-vinylpyridine, 2-methyl-5-vinylpyridine, 4-methyl-2-vinylpyridine, 2-isopropenylpyridine, 5-propyl-2-isopropenylpyridine, 2-octyl-5-vinylpyridine, methacrylonitrile, methyl acrylate, methyl methacrylate, ethyl acrylate, ethyl methacrylate, ethyl vinyl ketone, methyl isopropenyl ketone, methyl vinyl ether, and the like.

Lithium or any of its compounds can be used to promote the vulcanization or crosslinking of any of the above polymers. Materials which are preferred are those which can be easily handled and which do not remain radio-active except for short periods after being exposed to thermal neutrons. Compounds of lithium are therefore preferred rather than the metal and both inorganic and organic compounds are applicable. Such compounds include lithium oxide, lithium hydroxide, lithium bromide, lithium iodide, lithium fluoride, lithium nitrate, lithium carbide, lithium carbonate, and the like. Examples of lithium salts with organic acids include lithium acetate, lithium stearate, lithium propionate, lithium benzoate, lithium laurate, lithium myristate, lithium citrate, lithium formate, lithium oxalate, lithium palmitate, lithium salicylate, and the like. Examples of other organic lithium compounds such as the lithium alkoxides are lithium methoxide, lithium ethoxide, lithium propoxide, lithium butoxide, lithium decoxide, and the like. Organolithium compounds can also be used such as n-propyllithium, n-butyllithium, n-amyllithium, 1,2-dilithio-1,2-diphenylethane, 1,4-dilithiobutane, dilithionaphthalene, dilithiobiphenyl, and the like. As will be understood by those skilled in the art, when handling certain of these promoters special precautions are required.

The amount of promoter which is used in the polymer composition depends upon compounds selected for incorporation into the polymer. Generally the amount of compound must be such that at least 0.02 gram mol of lithium is present per 100 grams of polymer. The upper limit of promoter is limited primarily by practical considerations since it is normally undesirable to load the polymer heavily with additives which do not reinforce the structure of the composition itself. For this reason it is seldom desirable to exceed 1.0 gram mol of lithium per 100 grams of polymer. It is preferred that the additive compound be one which has a relatively low molecular weight such as lithium oxide and lithium methoxide. By using such compounds the mol requirement of lithium can be satisfied with a relatively small weight ratio of promoter to polymer. For most satisfactory results I prefer to use about 0.05 to 0.5 gram mols of lithium per 100 grams of polymer.

The method of incorporating a promoter into the polymer is not especially significant and any of a number of blending or milling procedures known in the art can be used. For example, the additive can be incorporated into the polymer by mixing on a roll mill or in a Banbury mixer or the like. It is also possible to apply my invention to the curing of polymers which contain lithium atoms in the molecular structure of the polymer itself. For this reason polymers containing terminal lithium atoms can be crosslinked according to my invention without adding a separate promoter to the polymerized material provided sufficient lithium is present to satisfy the minimum loading specified above.

The compositions of olefinic polymer and lithium are subjected to radiation in the thermal neutron field such as is provided in the thermal column of the Materials Testing Reactor at Arco, Idaho. The total neutron dosage required to effect vulcanization varies with the loading of the promoter. Less dosage is required as the loading of promoter is increased. Generally the radiation dosage is in the range of $1 \times 10^{15}$ nvt to $5 \times 10^{16}$ nvt where nv is the number of neutrons per square centimeter cross-section per second and t is the time. The loading of promoter and dosage can be adjusted to give the cure desired.

By thermal neutrons I refer to slow neutrons having an energy level of about 0.025 electron volt. Thermal neutrons have been defined as neutrons having a substantially Maxwellian number-energy distribution characteristic, about an energy level value equal to KT where K is a constant and T is the temperature in degrees Kelvin (KT=0.025 electron volt at 15° C.).

It is desirable that the polymer which is cured according to my invention be substantially ash-free and particularly that it be free from such metals as iron, cobalt, and the like, which have undesirable characteristics of long-lived radioactivity.

To further illustrate the advantages of my invention the following examples are presented which should be interpreted as being typical and not to limit my invention unduly.

EXAMPLE I

A low ash, 75/25 butadiene/styrene rubber, prepared by emulsion polymerization at 41° F., was compounded with high abrasion furnace black (Philblack O) and variable quantities of lithium methoxide. Formulations were as follows:

|  | Parts by Weight | | | |
| --- | --- | --- | --- | --- |
|  | 1 | 2 | 3 | 4 |
| Rubber | 100 | 100 | 100 | 100 |
| Philblack O | 50 | 50 | 50 | 50 |
| Lithium methoxide | 0 | 4 | 8 | 12 |

The lithium methoxide was prepared by reacting lithium with methyl alcohol, evaporating to dryness, and grinding the product in a mortar and pestle.

The stocks were milled and then sheeted off the mill and pressed in a hydraulic press between sheets of holland cloth to give sheets having a thickness of approximately 60 mils. Tensile and swell specimens were cut and placed in reactor grade graphite containers. Vulcanization using thermal neutrons was effected in the thermal column of the Materials Testing Reactor at Arco, Idaho, where the gamma radiation had been filtered out to the point of being negligible. The thermal neutron flux in this region of the reactor was approximately $1 \times 10^{10}$ nv where nv is the number of neutrons per square centimeter cross-section per second. Irradiation of the samples was carried out in a helium atmosphere to dosages of 0.4, 1.2, and $4.0 \times 10^{16}$ nvt. Physical properties of the irradiated samples were as follows:

| Promoter | | Gram Atoms Li per 100 g. Rubber | Dosage $\times 10^{-16}$ (nvt) | 300% Modulus, p.s.i.[a] | Tensile, p.s.i.[a] | Elong. percent[a] | $V_r$[b] | $v \times 10^4$ (moles/cc.) |
| --- | --- | --- | --- | --- | --- | --- | --- | --- |
| Compound | p.h.r. | | | | | | | |
| None | | | 0.4 | | 100 | 260 | 0.1294 | 0.09 |
|  | | | 1.2 | 100 | 100 | 310 | 0.1267 | 0.08 |
|  | | | 4.0 | 190 | 260 | 560 | 0.1678 | 0.15 |
| Lithium Methoxide | 4 | 0.1 | 0.4 | 330 | 420 | 510 | 0.1966 | 0.20 |
|  | | | 1.2 | 730 | 1,100 | 460 | 0.2826 | 0.45 |
|  | | | 4.0 | | 1,480 | 260 | 0.4052 | 1.40 |
| Do | 8 | 0.2 | 0.4 | 410 | 620 | 520 | 0.2221 | 0.25 |
|  | | | 1.2 | 1,060 | 1,320 | 370 | 0.3339 | 0.71 |
|  | | | 4.0 | | 1,260 | 170 | 0.4534 | 2.20 |
| Do | 12 | 0.3 | 0.4 | 590 | 1,040 | 550 | 0.2673 | 0.39 |
|  | | | 1.2 | | 1,330 | 290 | 0.3848 | 1.15 |
|  | | | 4.0 | | 1,150 | 110 | 0.4917 | 3.10 |

[a] All values underlined are obtained from atypical stress-strain curves, indicative of lack of cure. In these instances the stress-strain curve went through a maximum with the break occurring later, and at a lower value, as extension of the specimen was continued. The tensile strength recorded is the maximum value obtained rather than the breaking point. Values for 300 percent modulus and elongation were obtained from the curve used for tensile strength.
[b] $V_r$=volume fraction of polymer in swollen gel; n-heptane used as swelling agent.

The density of network chains is related to the number of cross-links by the function $$v = 2n - \frac{2\delta}{M}$$

where $n$ is the number of cross-links, $\delta$ is the density of the polymer and $M$ is the molecular weight. The technique for determining the density of network chains is described by Flory in Principles of Polymer Chemistry, Cornell University Press, Ithaca, New York (1953), pages 576–580.

Reference to the foregoing data reveals that both 300 percent moduli and swelling results show that extent of crosslinking responds in a linear fashion to neutron dosage and lithium concentration. The lack of response of the control reflects the fact that organic systems are transparent to thermal neutrons.

*Example II*

A low ash, butadiene/styrene rubber, prepared by emulsion polymerization at 41° F., was compounded with high abrasion furnace black (Philblack O) and variable quantities of lithium stearate. Recipes employed were as follows:

|  | Parts by Weight | | | |
| --- | --- | --- | --- | --- |
|  | 1 | 2 | 3 | 4 |
| Rubber | 100 | 100 | 100 | 100 |
| Philblack O | 50 | 50 | 50 | 50 |
| Lithium stearate | | 10 | 20 | 50 |

The procedure was the same as described in Example I. Irradiation of the samples was carried out in a helium atmosphere to dosages of 0.3, 0.8, and $1.3 \times 10^{16}$ nvt. Physical properties of the irradiated samples were as follows:

| Promoter | | Gram Atoms Li per 100 g. Rubber | Dosage $\times 10^{-16}$ (nvt) | $V_r$[a] | $v \times 10^4$ (moles/cc.) |
| --- | --- | --- | --- | --- | --- |
| Compound | p.h.r. | | | | |
| None | | | 0.3 | 0.1921 | 0.20 |
|  | | | 0.8 | 0.2011 | 0.21 |
|  | | | 1.3 | 0.2078 | 0.22 |
| Lithium stearate | 10 | 0.034 | 0.3 | 0.2034 | 0.21 |
|  | | | 0.8 | 0.2270 | 0.26 |
|  | | | 1.3 | 0.2477 | 0.32 |
| Do | 20 | 0.068 | 0.3 | 0.2392 | 0.30 |
|  | | | 0.8 | 0.2721 | 0.40 |
|  | | | 1.3 | 0.3023 | 0.53 |
| Do | 50 | 0.17 | 0.3 | 0.2597 | 0.36 |
|  | | | 0.8 | 0.3109 | 0.57 |
|  | | | 1.3 | 0.3518 | 0.85 |

[a] n-Heptane used as swelling agent.

The foregoing data indicate the response of the promoted systems to neutron dosage while the unpromoted stocks reflect their transparency to thermal neutrons. It can be seen from the swelling results that cross-linking responds to both dosage and lithium concentration. I have thus provided a method of safely curing polymeric materials by thermal neutron radiation.

As will be evident to those skilled in the art, various modifications of this invention can be made, or followed, in the light of the foregoing disclosure and discussion, without departing from the spirit or scope thereof.

I claim:

1. A method of vulcanizing rubber copolymers of a major amount of butadiene with a minor amount styrene, which comprises incorporating into said rubber lithium in an amount equal to 0.02 to 1.0 gram mols of lithium per 100 grams of rubber and subjecting the resulting lithium-containing composition to radiations consisting essentially of thermal neutrons of a dosage of $1 \times 10^{15}$ to $5 \times 10^{16}$ $nvt$.

2. The method of claim 1 wherein the lithium is incorporated into the rubber in an amount equal to 0.05 to 0.5 gram mols per 100 grams of rubber.

3. The method of claim 1 wherein the lithium is incorporated into the rubber in the form of lithium methoxide.

4. The method of claim 1 wherein the lithium is incorporated into the rubber in the form of lithium stearate.

References Cited in the file of this patent

UNITED STATES PATENTS

| | | |
|---|---|---|
| 2,904,484 | Houston et al. | Sept. 15, 1959 |

FOREIGN PATENTS

| | | |
|---|---|---|
| 741,826 | Great Britain | Dec. 14, 1955 |
| 742,933 | Great Britain | Jan. 4, 1956 |

OTHER REFERENCES

Davidson et al.: "MDDC—1949," pages 1–14, November 12, 1947.